US008917344B2

(12) United States Patent
Shiohara

(10) Patent No.: US 8,917,344 B2
(45) Date of Patent: *Dec. 23, 2014

(54) HIGHSPEED IMAGE SELECTING METHOD DIGITAL CAMERA HAVING HIGHSPEED IMAGE SELECTING FUNCTION

(71) Applicant: Seiko Epson Corporation, Tokyo (JP)

(72) Inventor: Ryuichi Shiohara, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/717,453

(22) Filed: Dec. 17, 2012

(65) Prior Publication Data

US 2013/0106858 A1    May 2, 2013

Related U.S. Application Data

(60) Continuation of application No. 12/533,600, filed on Jul. 31, 2009, now Pat. No. 8,350,947, which is a continuation of application No. 10/199,320, filed on Jul. 22, 2002, now Pat. No. 8,237,840, which is a division of application No. 09/059,330, filed on Apr. 14, 1998, now Pat. No. 6,445,412.

(30) Foreign Application Priority Data

Apr. 16, 1997 (JP) .......................... 9-99455
Jul. 2, 1997 (JP) ....................... 9-177458

(51) Int. Cl.
H04N 5/222 (2006.01)
H04N 5/228 (2006.01)
(Continued)

(52) U.S. Cl.
CPC ............ *G06T 17/00* (2013.01); *H04N 2101/00* (2013.01); *H04N 1/00458* (2013.01); *H04N 1/00461* (2013.01); *H04N 1/41* (2013.01); *H04N 1/0044* (2013.01); *H04N 1/2112* (2013.01)

USPC ............... 348/333.05; 348/222.1; 348/333.01

(58) Field of Classification Search
CPC .......... H04N 5/23293; H04N 1/00458; H04N 1/00411; H04N 21/4325; H04N 2201/3273
See application file for complete search history.

(56) References Cited

U.S. PATENT DOCUMENTS 4,511,989 A    4/1985 Sakamoto
4,740,828 A    4/1988 Kinoshita
(Continued)

FOREIGN PATENT DOCUMENTS

EP    0555048 A2    8/1993
EP    0583908 A2    2/1994
(Continued)

OTHER PUBLICATIONS

"Terminal Equipment and Protocols for Telematic Services", Information Technology—Digital Compression and Coding of Continuous-Tone Images—Requirements and Guidelines, Sep. 1992, The International Telegraph and Telephone Consultative Committee, International Telecommunication Union.

(Continued)

*Primary Examiner* — Luong T Nguyen
(74) *Attorney, Agent, or Firm* — Sughrue Mion, PLLC

(57) ABSTRACT

In a digital camera operation method, photographic images are taken with the camera and a corresponding compressed high resolution image and also a corresponding lower resolution image is stored for each. A fast display mode of the camera sequentially displays individual lower resolution display images, using the data of one of the lower resolution images. A normal display mode displays high resolution display images by expanding and displaying one of the compressed high resolution images. When changing from the fast display mode to the normal display mode, the lower resolution display image currently displayed can be replaced with the corresponding high resolution display image.

8 Claims, 7 Drawing Sheets

(51) Int. Cl.
*H04N 1/00* (2006.01)
*H04N 1/41* (2006.01)
*G06T 17/00* (2006.01)
*H04N 1/21* (2006.01)
*H04N 101/00* (2006.01)

(56) References Cited

U.S. PATENT DOCUMENTS

| | | | |
|---|---|---|---|
| 4,764,805 A | | 8/1988 | Rabbani et al. |
| 4,827,347 A | | 5/1989 | Bell |
| 4,829,453 A | | 5/1989 | Katsuta et al. |
| 4,969,204 A | | 11/1990 | Melnychuck et al. |
| 5,123,056 A | * | 6/1992 | Wilson ............ 382/132 |
| 5,142,616 A | | 8/1992 | Kellas et al. |
| 5,164,831 A | * | 11/1992 | Kuchta et al. ......... 348/231.7 |
| 5,189,552 A | | 2/1993 | Metwalli |
| 5,440,401 A | | 8/1995 | Parulski et al. |
| 5,497,193 A | | 3/1996 | Mitsuhashi et al. |
| 5,500,923 A | | 3/1996 | Kuroshima et al. |
| 5,541,656 A | | 7/1996 | Kare et al. |
| 5,576,759 A | | 11/1996 | Kawamura et al. |
| 5,612,732 A | | 3/1997 | Yuyama et al. |
| 5,631,701 A | | 5/1997 | Miyake |
| 5,706,097 A | | 1/1998 | Schelling et al. |
| 5,724,579 A | | 3/1998 | Suzuki |
| 5,734,427 A | * | 3/1998 | Hayashi ............ 348/333.11 |
| 5,903,309 A | | 5/1999 | Anderson |
| 5,914,725 A | | 6/1999 | MacInnis et al. |
| 5,933,137 A | | 8/1999 | Anderson |
| 5,943,050 A | * | 8/1999 | Bullock et al. ............ 715/783 |
| 5,966,122 A | | 10/1999 | Itoh |
| 6,002,429 A | | 12/1999 | Ochi et al. |
| 6,038,257 A | | 3/2000 | Brusewitz et al. |
| 6,097,431 A | * | 8/2000 | Anderson et al. ......... 348/231.7 |
| 6,111,605 A | | 8/2000 | Suzuki |
| 6,118,485 A | * | 9/2000 | Hinoue et al. ............ 348/373 |
| 6,122,003 A | | 9/2000 | Anderson |
| 6,147,703 A | | 11/2000 | Miller et al. |
| 6,184,930 B1 | * | 2/2001 | Mitsuhashi et al. ..... 348/333.01 |
| 6,215,523 B1 | | 4/2001 | Anderson |
| 6,233,015 B1 | * | 5/2001 | Miller et al. ............ 348/333.05 |
| 6,249,316 B1 | | 6/2001 | Anderson |
| 6,618,082 B1 | | 9/2003 | Hayashi et al. |
| 6,683,649 B1 | | 1/2004 | Anderson |
| 7,456,979 B2 | | 11/2008 | Nakatsu et al. |
| 8,237,840 B2 | * | 8/2012 | Shiohara ................ 348/333.05 |

FOREIGN PATENT DOCUMENTS

| | | | |
|---|---|---|---|
| EP | 0720388 | A2 | 7/1996 |
| JP | 6165100 | A | 6/1994 |
| JP | 6309376 | A | 11/1994 |
| JP | 07143426 | A | 6/1995 |
| JP | 7245723 | A | 9/1995 |
| JP | 0877194 | A | 3/1996 |
| JP | 8-223525 | A | 8/1996 |
| JP | 8223524 | A | 8/1996 |
| JP | 8251536 | A | 9/1996 |
| JP | 09037129 | A | 2/1997 |
| JP | 983849 | A | 3/1997 |
| JP | 09168132 | A | 6/1997 |
| JP | 1079912 | A | 3/1998 |
| JP | 1079913 | A | 3/1998 |
| JP | 10233995 | A | 9/1998 |
| JP | 1118044 | A | 1/1999 |
| WO | 9422108 | A1 | 9/1994 |
| WO | 9610782 | A1 | 4/1996 |
| WO | 9708888 | A1 | 3/1997 |

OTHER PUBLICATIONS

United States Office Action issued Sep. 2, 2011 in related U.S. Appl. No. 12/467,471.
Kodak Professional Digital Camera System—Users Manual, 1991, 1992, Eastman Kodak Company, Rochester, NY.
Japanese Office Action for JP-A-2002-115041, Oct. 1, 2002.
Japanese Office Action for JP-A-2002-115006, Oct. 1, 2002.
U.S. Non-Final Office Action issued Feb. 24, 2011 in U.S. Appl. No. 10/199,320.
U.S. Office Action issued Sep. 30, 2010 in U.S. Appl. No. 10/199,320.
Official Communication from European Patent Office dated Feb. 13, 2008.
Minutes of Oral Proceeding Communication in European Patent Office dated Jun. 9, 2009.
Decision of Refusal Communication from European Patent Office dated Jun. 9, 2009.

* cited by examiner

HIGHSPEED IMAGE SELECTING METHOD DIGITAL CAMERA HAVING HIGHSPEED IMAGE SELECTING FUNCTION

CROSS-REFERENCE TO RELATED APPLICATIONS

This application is a continuation of U.S. Application Ser. No. 12/533,600 filed Jul. 31, 2009, which is a continuation of U.S. Application Ser. No. 10/199,320, filed Jul. 22, 2002, which is a divisional of U.S. Application Ser. No. 09/059,330, filed Apr. 14, 1998, which are incorporated by reference, herein, in their entirety.

BACKGROUND OF THE INVENTION

The present invention is related to a digital camera, and more specifically, directed to a high speed image selecting method and a digital camera equipped with a high speed image selecting function, by which an enlarged thumbnail image is fed in fast-forward/fast-backward modes when an image is displayed on a display unit such as a liquid crystal display.

Very recently, digital cameras (electronic still image cameras) have been developed, and are commercially available, and thus are gradually popularized.

A digital camera is arranged as follows. Imaging (photographing) light is photoelectrically converted into image data, and this image data is recorded on a recording medium, and thereafter is outputted to an external image processing apparatus, for instance, a personal computer. Then, the image data is processed by way of a printing image data forming process in the external image processing apparatus, and then the formed printing image data is outputted to a printer, so that a photographed image is printed/reproduced on a print paper.

It should be noted that the most digital cameras are equipped with liquid crystal displays (LCD) for displaying photographed images and the like. On the other hand, image data acquired by photoelectric converting operation are compression-processed to be recorded on recording media. Normally, the compression process operation is carried out based on the JPEG (Joint Photographic Image Coding Experts Group) standard (will be referred to as "JPEG compression" hereinafter).

In the case that an image is selected on the side of a personal computer, a plurality of thumbnail images are previously acquired to be displayed on a monitor, and a user selects a desirable image. Then, the selected image data is acquired from a digital camera to be expanded, and the expanded image is displayed on the monitor. After this expanded image is confirmed by the user, this image is processed by executing a color printing image data forming process, and then this processed image is printed out by a printer connected to the personal computer.

A thumbnail image corresponds to a compressed image which is used when a desirable image is selected from image data acquired by a personal computer and the like. Assuming now that a data size (namely memory capacity) of image data for 1 frame is equal to 1,024×768 pixels, a thumbnail image corresponding to this 1-frame image is such a compressed image having approximately 86×60 pixels by thinning image data from this 1-frame image data. Then the thumbnail image is recorded on a recording medium of a digital camera.

In such a system that a digital camera is connected to a communication line and a wireless (radio) unit such as a portable telephone so as to transmit desirable image data via either a wire line or a wireless line, and/or in order to directly transmit printing image data from the digital camera to a printer to be printed out, this system should be arranged in a manner that the images are reproduced on a liquid crystal display on the side of the digital camera so as to select a desirable image.

However, since the image data have been JPEG-compressed to be stored in the recording medium, these JPEG-compressed image data stored in this recording medium should be read out and then be expanded, and thereafter be extended over a frame memory in order to reproduce/display the images on the liquid crystal display.

When expanding means for compressed data is constituted by a hardware circuit, expanding/extending process time of these compressed data may be shortened. However, in popularized digital cameras, expanding means are normally arranged in a program form (will be referred to as an "expanding program" hereinafter) so as to reduce product cost. In such popularized digital cameras, 2 to 3 seconds are necessarily required to expand a 1-frame image (1,024×768 pixels) which has been JPEG-compressed by using this expanding program.

As a result, there is a problem that users have such feelings that image display time would be prolonged. Moreover, when a desirable image is selected, image data must be sequentially read out to be displayed. Under such a circumstance, if a desirable image is stored in a later order, then a long time duration is actually required in order to select this desirable image. Thus, there is a further problem that such a lengthy access time is practically inconvenient.

SUMMARY OF THE INVENTION

The present invention has been made to solve the above-described problems, and therefore, has an object to provide a high speed image selecting method, and also a digital camera equipped with a high speed image selecting function, capable of enlarging a thumbnail image to feed the enlarged thumbnail image in a fast mode.

To achieve these and other objects, a high speed image selecting method, according to a first aspect of the present invention, is featured by such a high speed image selecting method for selecting an image photographed by a digital camera, comprising the steps of: enlarging and feeding the enlarged thumbnail images sequentially in fast-forward/fast-backward modes to be sequentially displayed; and when a desirable thumbnail image is selected from the enlarged thumbnail images under display, extending compression image data corresponding to the selected thumbnail image so as to acquire image data.

In this first aspect, the thumbnail image is fed in the fast-forward/fast-backward modes to be displayed in a high speed. After a desirable thumbnail image is selected, the compressed image data is expanded, so that the image can be selected in a high speed.

In accordance with a second aspect of the present invention, in the high speed image selecting method of the first aspect, the enlarged thumbnail images are indexed, and then the enlarged thumbnail images with the indexes are sequentially fed in the fast-forward/fast-backward modes to be sequentially displayed.

In this second aspect, the thumbnail images with the indexes are enlarged and the enlarged thumbnail images are fed in the fast-forward/fast-backward modes, so that the image can be further easily selected.

In accordance with a third aspect of the present invention, a digital camera equipped with a high speed image selecting function is featured by that in a digital camera for recording on a recording medium, image data produced by photoelectrically converting photographing light and thumbnail image data thereof, a digital camera equipped with a high speed image selecting function, comprising: a display unit for displaying an image; data expanding means for expanding compressed image data; thumbnail enlarged image display means for enlarging thumbnail image data and for displaying the enlarged thumbnail image data on the display unit; thumbnail image selecting means for feeding the enlarged thumbnail image under display in fast-forward/fast-backward modes to select a desirable thumbnail image; image display means for displaying image data corresponding to the selected thumbnail image on the display unit; and selection image defining means for defining the displayed image as a selection image.

In this third aspect, the thumbnail image is fed in the fast-forward/fast-backward modes to be displayed in a high speed. After a desirable thumbnail image is selected, the compressed image data is expanded, so that the image can be selected in a high speed.

In accordance with a fourth aspect of the present invention, a digital camera equipped with a high speed image selecting function is featured by that the fast-forward/fast-backward feeding operations of the enlarged thumbnail image by the thumbnail image selecting means are commenced by executing a predetermined switch operation.

In accordance with the fourth aspect, the enlarging process and the fast-forward/fast-backward feeding operations of the thumbnail image can be readily realized by a predetermined switch operation, so that the thumbnail images can be selected in a high speed.

A digital camera equipped with a high speed image selecting function according to a fifth aspect of the present invention, is featured by that in the digital camera equipped with the high speed image selecting function, as described in the third aspect or the fourth aspect, the fast-forward/fast-backward feeding operations of the enlarged thumbnail image by the thumbnail image selecting means are commenced when an instruction is issued such that forward/backward feeding operations of normal image data are continuously performed within a predetermined time period.

In accordance with the fifth aspect, when the image selection is continuously performed within a predetermined time period, the operation is automatically transferred to the enlarging operation and the fast-forward/fast-backward operations of the thumbnail image, so that the thumbnail image can be readily selected in a high speed. Also, since the enlarged thumbnail image is displayed until the image data is displayed, the waiting tension given to the user can be relaxed.

A digital camera equipped with a high speed image selecting function, according to a sixth aspect of the present invention, is featured by that in the digital camera equipped with the high speed image selecting function, as described in the third aspect, the fourth aspect, or the fifth aspect, the expanding process of the image data by the data expanding means is carried out in conjunction with the display process of the enlarged thumbnail image corresponding thereto.

According to the sixth aspect, since the enlarging/display process operation of the thumbnail image and the expanding process of the image data are carried out, the image data can be quickly displayed after the selecting operation.

A digital camera equipped with a high speed image selecting function, according to a seventh embodiment of the present invention, is featured by that the digital camera equipped with the high speed image selecting function, as described in any one of the preceding aspects 3 to 6, is further comprised of: indexing means for indexing the enlarged thumbnail image displayed by the thumbnail enlarged image display means. In accordance with the seventh embodiment, since the enlarged thumbnail images are indexed, the image selection by the fast-forward/fast-backward operation can be readily performed.

A recording medium, according to an eighth aspect of the present invention, is featured by such a recording medium readable by a digital camera for recording on the recording medium, image data produced by photoelectrically converting photographing light and also thumbnail image data thereof, on which a program is recorded and the program is capable of realizing: a data expanding function for expanding compressed image data; a thumbnail enlarged image display function for enlarging the thumbnail image data and for displaying the enlarged thumbnail image data on a display unit; a thumbnail image selecting function for feeding the enlarged thumbnail image under display in fast-forward/fast-backward modes to select a desirable thumbnail image; an image display function for displaying the expanded image data corresponding to the selected thumbnail image or the display unit; and a selection image defining function for defining the displayed image as a selection image.

Since the program recorded on the recording medium according to the eighth aspect of the present invention is executed, the enlarged thumbnail image can be fed in the fast-forward/fast-backward operations.

DETAILED DESCRIPTION

Figure 1:
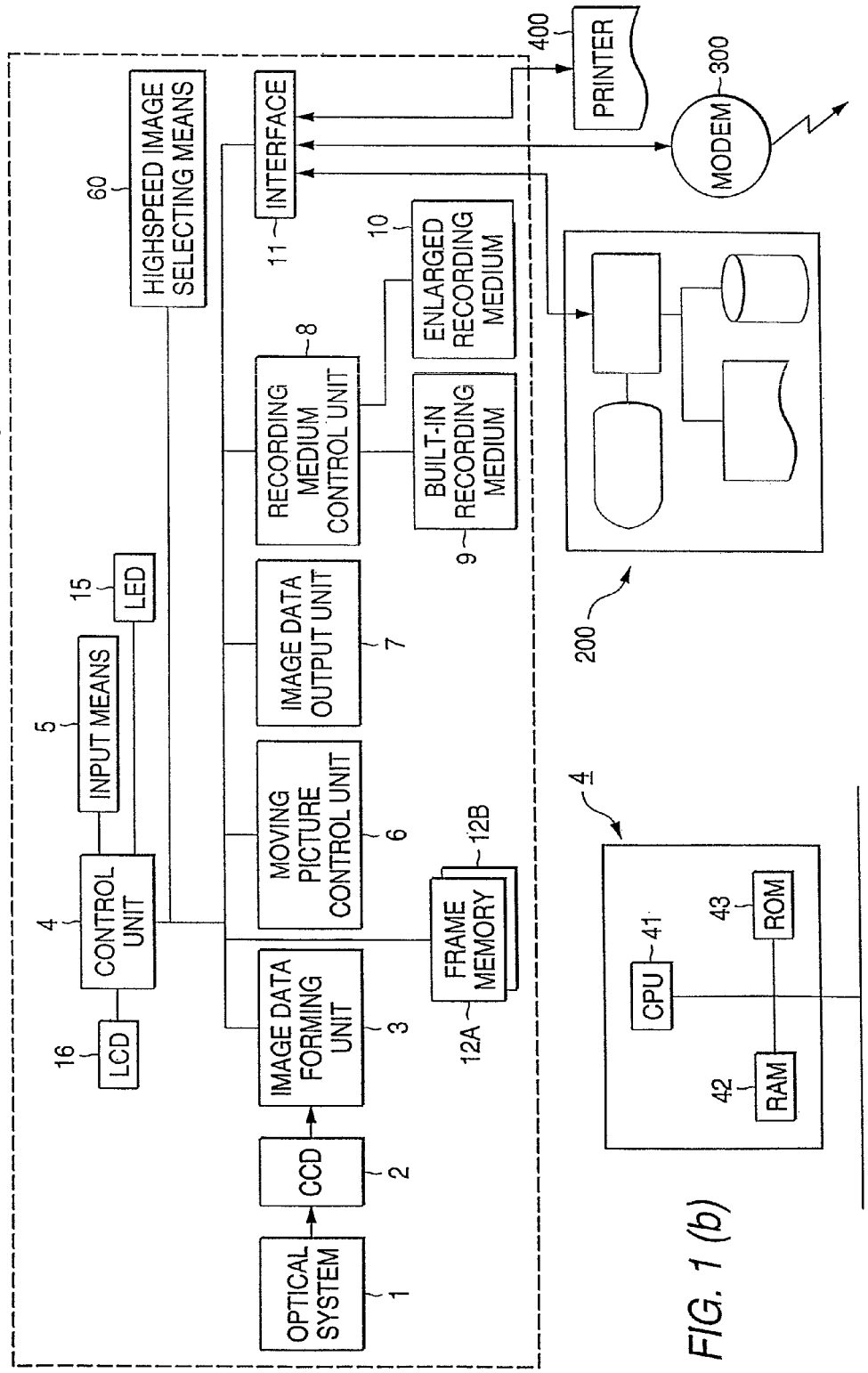
FIGS. 1(a) and 1(b) is a block diagram for showing a structural example of a digital camera equipped with a high speed image selecting function according to an embodiment of the present invention.

FIGS. 1(a) and 1(b) are block diagrams for representing a structural example of a digital camera according to an embodiment of the present invention.

In FIG. 1(a), a digital camera 100 is constructed of an optical system made of a lens and a diaphragm, for entering reflection light reflected from an imaging object onto a CCD 2; a CCD 2 for converting the imaging light projected from the optical system 1 into an electric signal; and an image data forming unit 3 for processing the electric signal derived from the CCD 2 to be supplied as raster data (image data) of multiple values (R, G, B) to a frame memory 12A. Furthermore, the digital camera 100 is arranged by a control unit 4, an input means 5, a moving picture display control unit 6, an image data output unit 7, a recording medium control unit 8, a built-in recording medium 9, an enlarged recording medium 10, an interface 11, an LED lamp 15 functioning as a display means, and a liquid crystal display 16.

In this digital camera, the control unit 4 controls the executions of the operation controls, the image processing operations, and the image compressing/expanding process operations of the image data forming unit 3, the moving picture display control unit 6, the image data output unit 7, the recording medium control unit 8, and the high speed image selecting means 60. The input means 5 is constituted by a button and a switch. The input means 5 inputs an instruction made by a user by manipulating these button and switch, and converts the instruction into a digital signal which will be then supplied to the control unit 4.

The moving picture display control unit 6 outputs the image data to the liquid crystal display 16 so as to display the moving picture. In this embodiment, the image data stored in the frame memories 12A and 12B are displayed in a superimpose manner during the normal display mode. Normally, it should be noted that the image data are written into the frame memory 12A predetermined times, for example, 30 times, or 60 times per 1 second by the image data forming unit 3, and the image is displayed on the liquid crystal display 16 under control of the moving picture display control unit 6 in synchronism with the writing operation of the image data in the same phase.

In the case that a specific button is depressed while displaying a moving picture to instruct an image recording operation, the image data output unit 7 converts the R, G, B raster data saved in the frame memory 12A into a luminance component Y, and color difference components U and V. Also, the image data output unit 7 subjects to these luminance/color difference components to the JPEG-compression, and further executes a compression process operation for producing a thumbnail image.

Upon receipt of the image data outputted from the image data output unit 7, the recording medium control unit 8 controls a writing operation such that JPEG-compressed image data (simply will be referred to as "image data" hereinafter) and compressed image data are written into a predetermined position of the built-in recording medium 9, or the enlarged recording medium 10, and also controls a reading operation of each of the recorded JPEG image data.

The built-in recording medium 9 and the enlarged recording medium 10 are provided to store thereinto the image data. A serial interface, or a parallel interface 11 is employed to transmit/receive data to/from an external apparatus. Also, the LED lamp 15 displays a condition of a switch, and a functional specification. The liquid crystal display 16 displays a photographed image, or an object to be imaged.

Normally, the frame memory 12A is used as an image display memory of the liquid crystal display 16. The image data is extended in this frame memory 12A as a bit map image. The frame memory 12B is employed as a menu display memory, if required. Then, when an image is displayed on the liquid crystal display 16, the storage contents of the frame memories 12A and 12B are displayed in a superimposed manner, if required.

In this embodiment, the built-in recording medium 9 is constructed of a 4 MB (Megabytes)-flash memory fixed inside the camera 100. Not only the image data, but also other data such as a program are stored into the built-in recording medium 9. In this embodiment, as the enlarged storage medium 10, a 4 to 45 MB-memory card is utilized. In this case, although a memory card interface (PCMCIA interface or ATA interface: not shown) is employed, the present invention is riot limited thereto, but other card type memories such as a compact flash (a trade mark of Sun Disk Inc.) may be utilized.

FIG. 1(b) represents an arrangement of the control unit 4. The control unit 4 is arranged by a CPU 41, a RAM 42, and a ROM 43. In this ROM 43, a program group has been previously stored, which is required to execute a data process operation within the digital camera 100, for example, the operation control of the digital camera 100, and the data compressing/expanding process operations.

Also, the digital camera 100 transmits the image data stored in the built-in recording medium 9 via the interface 11 to an external apparatus, for instance, a computer unit. The digital camera 100 communicates the image data via the modem 300. Furthermore, in such a case that a printing image data forming process program group is saved in the digital camera 100, printing image data is formed. Then the printing image data may be directly transmitted to a printer 400 so as to print out the image.

Figure 2:
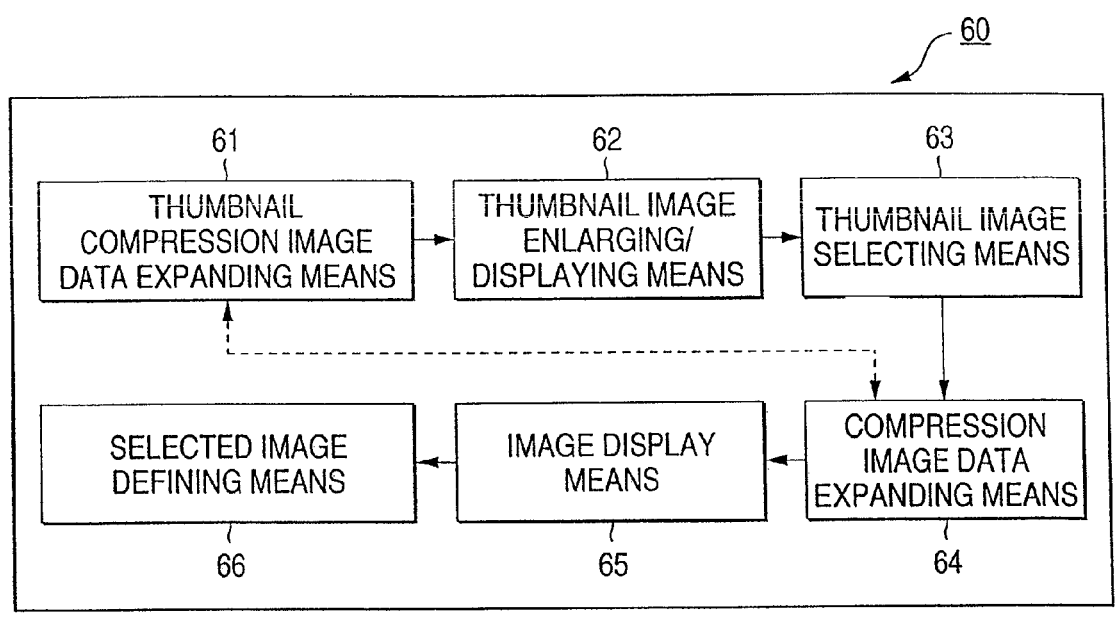
FIG. 2 is a block diagram for representing a structural example of high speed image selecting means.

FIG. 2 is a schematic block diagram for showing a structural example of the high speed image selecting means 60 which may constitute a major portion of the digital camera according to the present invention. The high speed image selecting means 60 is constituted by a thumbnail compression image data expanding means 61, a thumbnail image enlarging/displaying means 62, a thumbnail image selecting means 63, a compression image data expanding means 64, an image display means 65, and a selected image defining means 66.

It should be understood that the high speed image selecting means 60 according to this embodiment is constituted by software. Alternatively, the high speed image selecting means 60 formed in the software may be arranged to be stored in the ROM 43. Otherwise, the high speed image selecting means 60 recorded on an external recording medium as a software form may be acquired to be saved into the recording medium 9. When the high speed image selecting means 60 is executed, this high speed image selecting means 60 formed in the software may be transferred to the RAM 42.

The thumbnail compression image data expanding means 61 cause the thumbnail image data to be acquired into the RAM 42 so as to execute the expanding process operation of the compressed thumbnail image data, and then extends the expanded thumbnail image data into the RAM 42. Since a pixel number of a thumbnail image is small, even when all of the thumbnail images are expanded, a total time duration to execute this expanding process thereof is extremely shorter than the expanding time of the image data. It should also be noted that in such an image process system that no compression process operation is performed to the thumbnail image data, this thumbnail compression image data expanding means 61 is no longer required.

Figure 3:
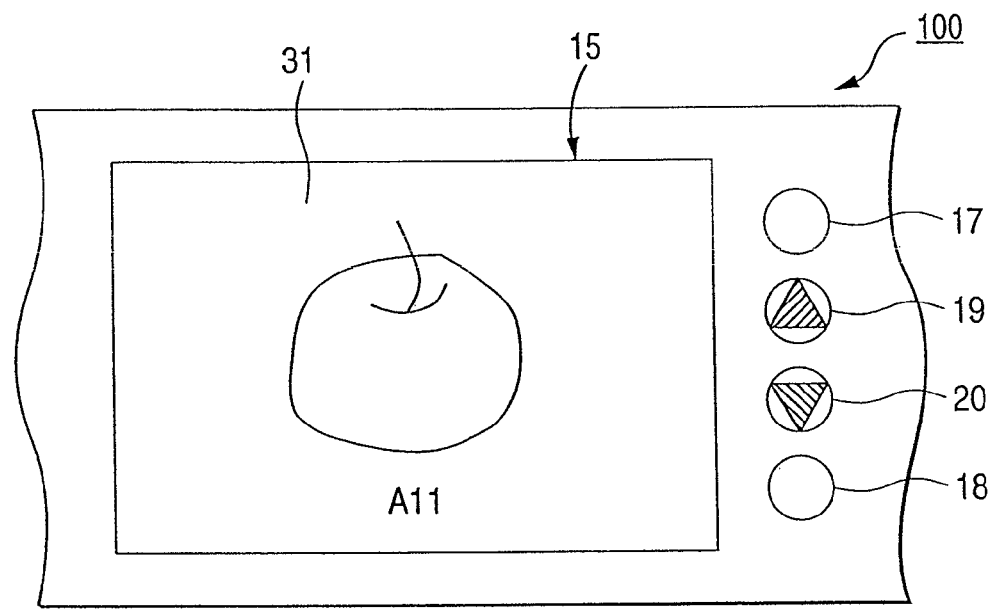
FIGS. 3(a) and 3(b) show a rear surface portion of the digital camera.
Figure 3:
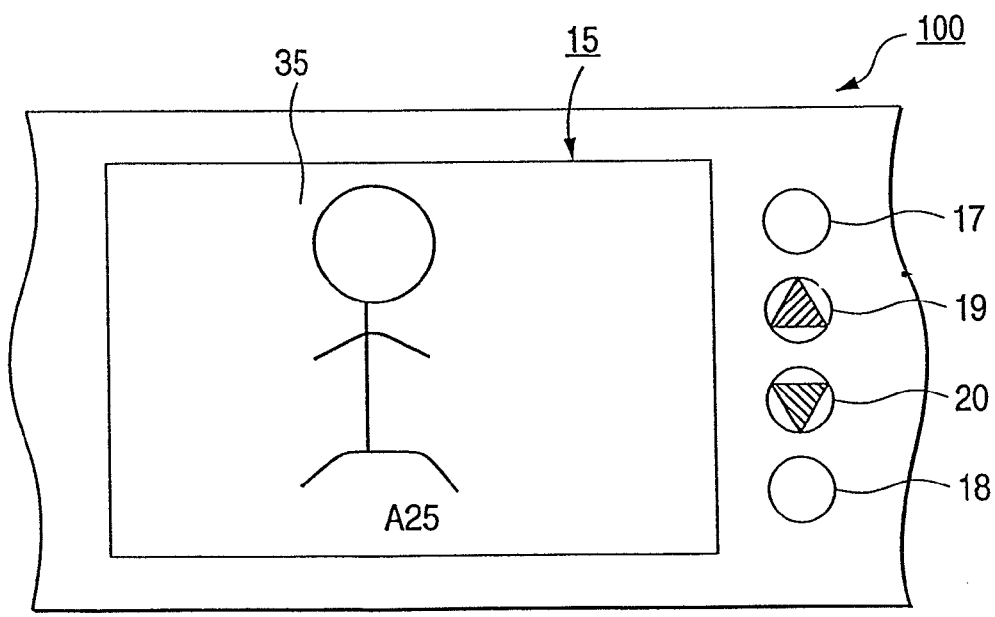

The thumbnail image enlarging/displaying means 62 enlarges the expanded thumbnail image data, and transfers the enlarged thumbnail image data to the frame memory 12A so as to extend the enlarged thumbnail image data as a picture image. Then, the thumbnail image enlarging/displaying means 62 causes either an enlarged thumbnail image 31 or an enlarged thumbnail image 35 to be displayed as an enlarged image on the liquid crystal display 16 (FIG. 3(a) and FIG. 3(b)).

In this case, when a thumbnail image is simply enlarged to be displayed, intervals among adjoining pixels become coarse, so that the overall image is blurred. As a consequence, it is preferable to display such a thumbnail image produced by interpolating an enlarged image (see FIGS. 4(a) and 4(b)).

When the button provided near the liquid crystal display 16 is manipulated by the user, the thumbnail image selecting means 63 judges the implication of this button manipulation, and scrolls the enlarged thumbnail image 31 or 35 within the display screen in order that a desirable image by the user is specified.

When the enlarged thumbnail image is displayed, the compression image data expanding means 64 acquires image data corresponding to this enlarged thumbnail image from the recording medium so as to expand this acquired image data to thereby extend the expanded image data.

The image display means 65 transfers the image data extended in the RAM 42 to the frame memory 12A, and then extend this transferred image data as a picture image to thereby display this picture image on the liquid crystal display 16. As a result, the expanding process operation of the image data is accomplished, which is specified while the enlarged thumbnail image displayed in the above-described manner is observed by the user. Then, the specified/expanded image data is overwritten into the enlarged thumbnail data, so that clear image data can be displayed.

When the button provided near the liquid crystal display 16 is manipulated by the user, the selected image defining means 66 judges the implication of this button manipulation, and will execute a subsequent process operation when this button manipulation instructs the definition of the selected image.

For the sake of an easy explanation, the thumbnail compression image data expanding means 61 is separately provided with the compression image data expanding means 64. However, since the image data to be expanded are different from each other, both the thumbnail compression image data expanding means 61 and the compression image data expanding means 64 may be arranged to employ the same data expanding means, for example, may be arranged as a subprogram.

Also, the above-described high speed image selecting means 60 may be employed so as to not only select the image in the digital camera, but also select the image of the digital camera acquired by the personal computer.

Now, a description will be made of a pixel interpolating method that can be employed by the thumbnail image enlarging/displaying means 62.

Figure 4:
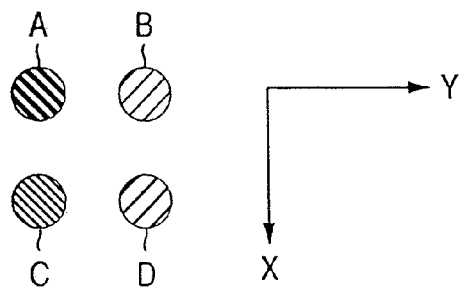
FIGS. 4(a) and 4(b) are explanatory diagrams for explaining a pixel interpolation method (simple interpolation method)
Figure 4:
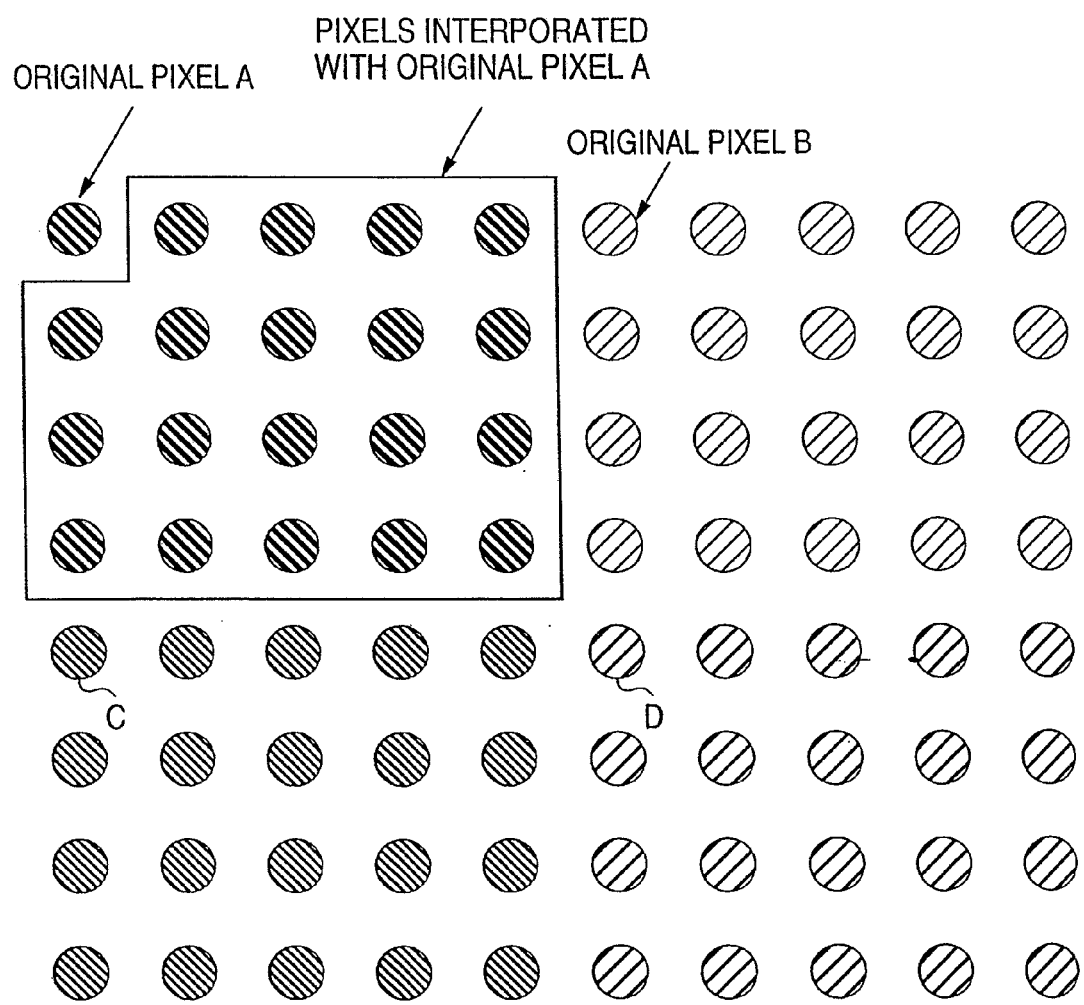

Typically, there are the linear interpolation method and the simple interpolation method (FIGS. 4(a) and 4(b)) as a pixel interpolating method. The present invention may employ any of these interpolation methods.

In the linear interpolation method, a resolution conversion is carried out by performing a linear interpolation between adjoining two points, so that resolution with a predetermined level can be maintained.

To the contrary, the simple interpolation method is such an interpolation method that, as indicated in FIGS. 4(a) and 4(b), while positions of original pixels A, B, C, and D after being enlarged are calculated, assuming now that a magnification is selected to be "R" and "S" (both R and S are positive integers), the original pixels are copied (R−1) times along the X directions. After the copying operations of the original pixels along the X direction are accomplished, the original pixels are copied (S−1) times along the Y direction to fill the intervals among these original pixels.

In other words, as shown in FIG. 4(a), while an origin is set as the original pixel "A", if an image constituted by original pixels A(0,0), B(0,1), C(1,0), and D(1,1,) located adjacent to each other is first enlarged 4 times along the X direction, and then is enlarged 5 times along the Y direction, then positions of the original pixels A, B, C, and D after being enlarged become A(0,0), B(0,5), C(4,0) and D(4,5) (see FIG. 4(b)). Then, the original pixels A, B, C, and D are copied only 3 (=4−1) times along the X direction so as to fill the intervals. When the copy operations of the original pixels along the X direction are accomplished, the column is copied only 4 (=5−1) times along the Y direction. As a result of this operation, as represented in FIG. 4(b), the pixels enlarged by the magnification of 4×5 are formed on the bit map.

In accordance with the linear interpolation method, gradation between two points may be calculated, and gradation of an enlarged image can be maintained at a certain level. As a consequence, the image quality achieved by this linear interpolation method is better than that achieved by another interpolation method. However, when the linear interpolation calculation is performed by employing a computer, a complex dividing calculation is required except for a specific case, so that a lengthy processing time period is needed. To the contrary, a processing time period by in the simple interpolation method requires the shortest time. However, since the gradation is not adjusted but also pixels are simply copied, the image quality is coarse. The larger the enlargement ratio becomes, the lower the quality of the enlarged image is rapidly decreased. Accordingly, there is a limitation that the enlargement ratio by the simple interpolation method is selected to be on the order of 4 times.

In accordance with this embodiment, the size of the screen of the liquid crystal display 16 employed in the digital camera 100 is limited, arid is substantially equal to a size of a thumbnail image×4 times. As a consequence, there is no problem as to the image quality. Moreover, since the interpolation speed achieved by this simple interpolation method is faster than that of another interpolation method, the enlarged thumbnail image is interpolated by employing the simple interpolation method. It should be understood that when a higher image quality of a displayed image is required, the linear interpolation method is preferably employed.

Figure 5:
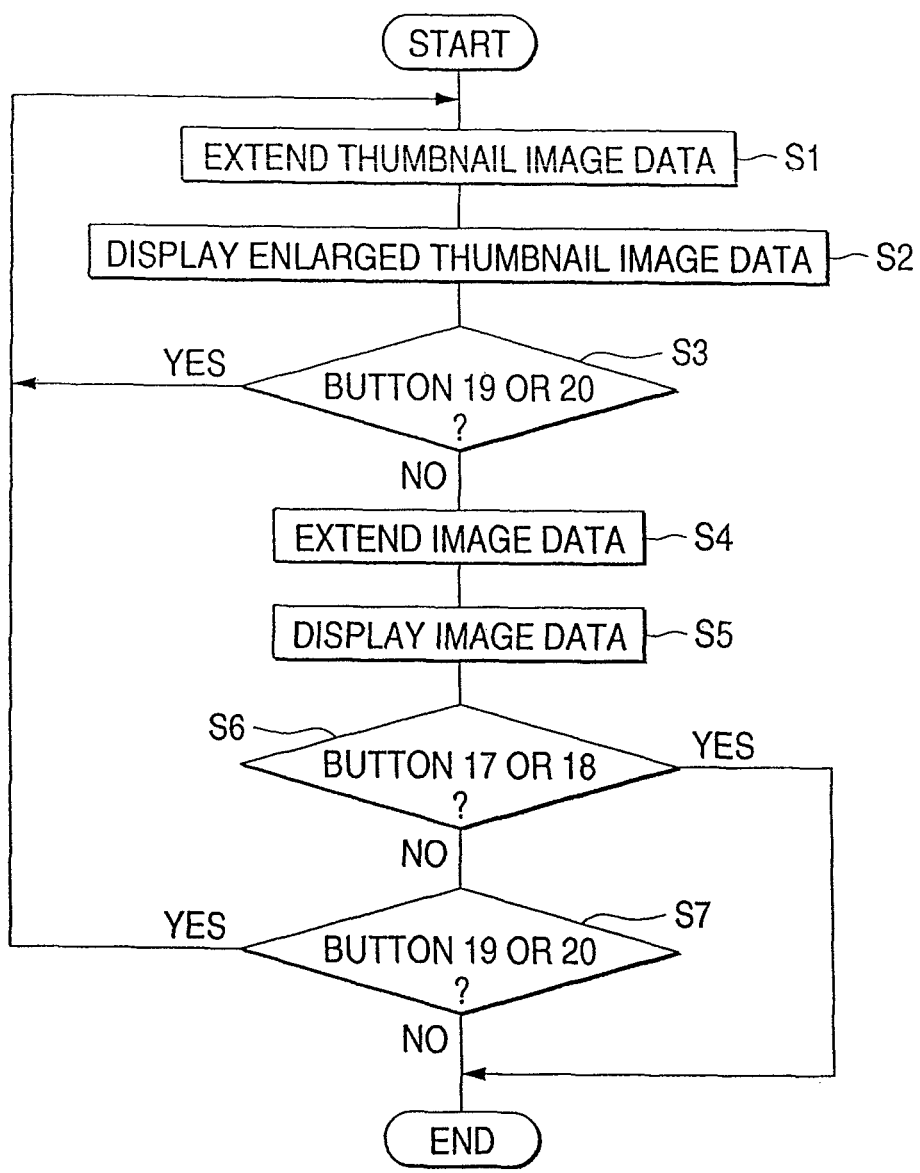
FIG. 5 is a flow chart for describing an example 'of operation of the high speed image selecting means.

FIG. 5 is a flow chart for indicating an example of operations of the high speed image selecting means. It is assumed that as an initial condition, both the thumbnail image data and the image data have been subjected to the JPEG-compression and the JPEG-compressed image data have been recorded on the recording medium 9. As indicated in FIG. 5, when either the button 19 or the button 20 is depressed to commence the high speed image selection, the thumbnail compression image data expanding means 61 acquires the thumbnail image data into the RAM 42, and then expands the JPEG-compressed thumbnail image data to extend the expanded thumbnail image data into the RAM 42 (step S1). Subsequently, the thumbnail image emerging/displaying means 62 sequentially gives index numbers to the expanded thumbnail image (namely, image with image number 31 in FIG. 3(a)), and then enlarges/interpolates the thumbnail image data with the index number (namely, simple interpolation method in this embodiment). Thus, the interpolated thumbnail image data is displayed as an enlarged thumbnail image on the liquid crystal display 16 (step S2). Also, when the user depresses the button 19 or the button 20, the high speed image selection process operation is returned to the step S1 (step S3: YES).

While the button 20 (fast-forward button) provided near the liquid crystal display 16 is continuously depressed by the user, the thumbnail image selecting means 63 repeats the process operations defined at the steps S1 and S2 to successively display the thumbnail images on the liquid crystal display 16 (fast-forward) in the increment order. Conversely when this button 20 is released by the user, the display of this thumbnail image is stopped.

The button 19 is the fast-backward button. While this fast-backward button 19 is continuously depressed by the user, the thumbnail image selecting means 63 repeats the process operations defined at the steps S1 and S2 to successively display the thumbnail images on the liquid crystal display 16

(fast-backward) in the decrement order. When this button 19 is released by the user, the display of this thumbnail image is stopped.

When the image stop time duration has passed for a predetermined time period (2 seconds in this embodiment), it is assumed that this image is specified as the selected image. Then, the process operation is advanced to the next step S4 (step S3: NO).

At a step S4, when the enlarged thumbnail image is displayed, the compression image data expanding means 64 acquires the image data corresponding to this enlarged thumbnail image from the RAM 42 to expand this acquired image data, and then extends the expanded image data into this RAM 42. Subsequently, the image display means 65 transfers the image data extended in the RAM 42 to the frame memory i2A so as to be extended as the picture image. Then, the image display means 65 overwrites this extended image data on the liquid crystal display 16 (step S5).

When either the button 17 or the button 18 is depressed by the user, the selected image defining means 66 executes the "next process" (step S6: YES). When either the button 19 or the button 20 is depressed by the user, the process operation is returned to the step 51 (step S7: YES).

Alternatively, in such a case that even when a predetermined time period (for example, 6 seconds) has passed, either the button 19 or the button 20 is not depressed at the step 6, the selected image defining means 66 may be arranged to execute the "next process".

It should be understood that as the "next process" after the image is selected by the high speed image selecting means 60, there are a preparation process operation and a printing image data forming process operation. In this preparation process operation, this image data is transmitted via the wireless line, or the wire line. In this printing image data forming process operation, the printing data is formed in order to directly print out the image by the printer. These process operations may be executed by another program separately introduced into the digital camera 100.

Figure 6:
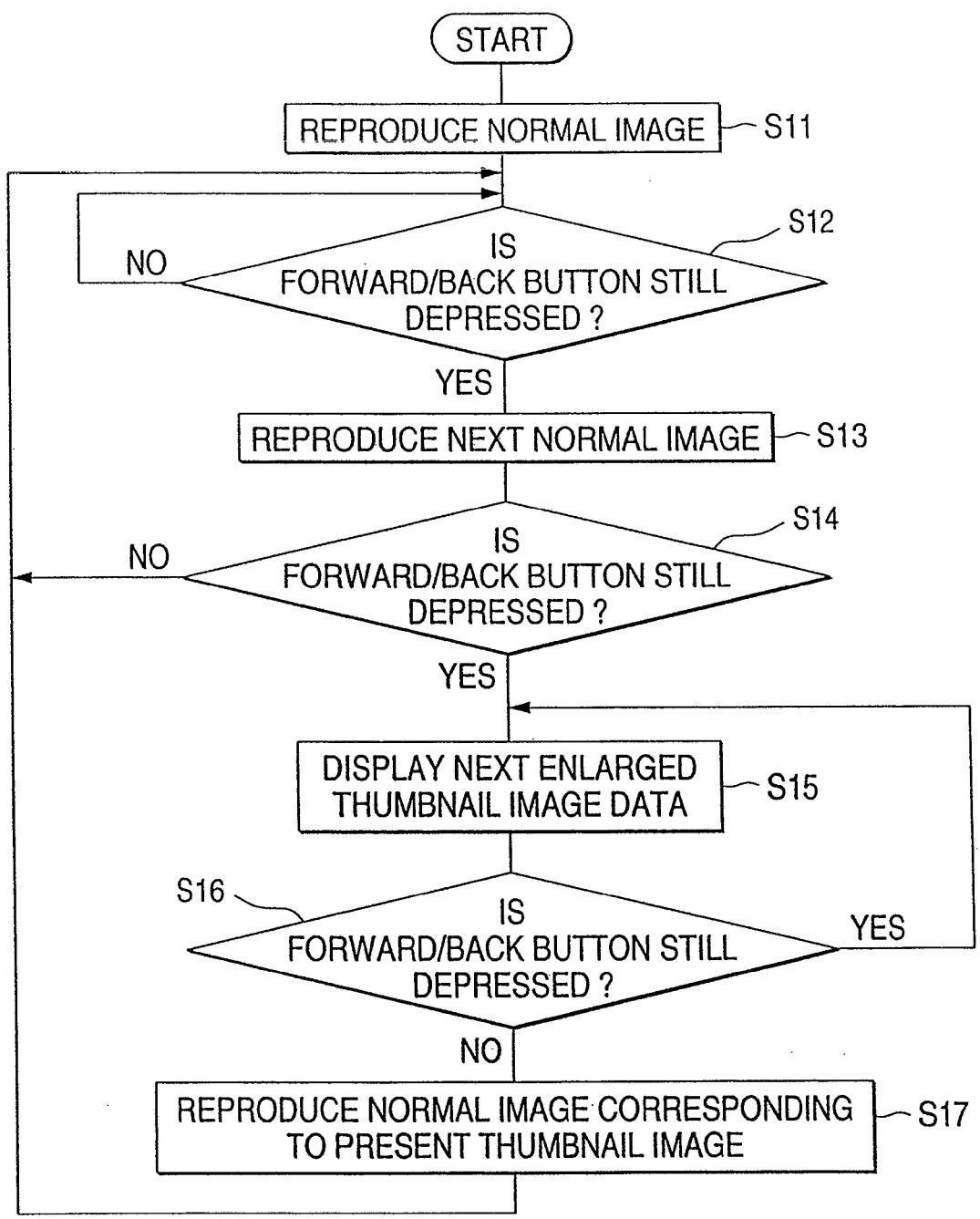
FIG. 6 is a flow chart for describing an example of operation of the high speed image selecting means.

FIG. 6 is a flow chart for indicating an example of operations of the high speed image selecting means. It is assumed that as an initial condition, both the thumbnail image data and the image data have been JPEG-compressed and the JPEG-compressed image data have been recorded on the recording medium 9.

In the example of FIG. 5, when the last-forward key button 20 and the fast-backward key button 19 are depressed, the fast-forward operation and the fast-backward operation are commenced. In this example, the normal reproducing operation is carried out at the first stage. When either the button 19 or the button 20 is continuously depressed under a predetermined condition, the operation mode is transferred to the high speed image selection mode.

That is, when the normal reproducing operation is carried out (step S 11), if either the button 19 or the button 20 is depressed (step S12: YES), then the compressed image data expanding means 64 acquires one preceding image data, or one succeeding image data into the RAM 42, and expands/extends these acquired image data. Subsequently, the image display means 65 transfers the image data extended in the RAM 42 to the frame memory 12A so as to extend this image data as a picture image which is displayed on the liquid crystal display 16 (step S13).

In this case, if the same button is depressed at the time when the image reproducing operation is completed (step S14: YES), the process operation is advanced to the high speed image selection mode. The thumbnail compression image data expanding means 61 acquires thumbnail image data corresponding to one preceding image data, or the one succeeding image data into the RAM 42, and then expands the JPEG-compressed thumbnail image data to extend the expanded thumbnail image data into the RAM 42. Subsequently, the thumbnail image enlarging/displaying means 62 enlarges/interpolates the expanded thumbnail image data (namely, simple interpolation method in this embodiment). Thus, the interpolated thumbnail image data is displayed as an enlarged thumbnail image on the liquid crystal display 16 (step S15).

In such a case that the button is further continuously depressed when this display of the enlarged thumbnail image is completed (step S16: YES), the process operation is returned to the step S14 at which One preceding thumbnail image, or one succeeding thumbnail image is enlarged to be displayed. While the button is continuously depressed, this process operation is repeatedly carried out, so that the high speed image selection can be realized.

On the other hand, when depressing of the button is stopped (step S16: NO), the enlarged thumbnail image is displayed, the compression image data expanding means 64 acquires the image data corresponding to the thumbnail image under display from the RAM 42 to expand this acquired image data, and then extends the expanded image data into this RAM 42. Subsequently, the image display means 65 transfers the image data extended in the RAM 42 to the frame memory 12A so as to be extended as the picture image. Then, the image display means 65 overwrites this extended image data on the liquid crystal display 16 (step S17). Then, the process operation is returned to the step S12.

While the operations of the high speed image selection process have been described, switching of the normal reproduction operation and the high speed selection reproduction operation may be executed by manipulating a predetermined switch, otherwise by any other manners.

Figure 7:
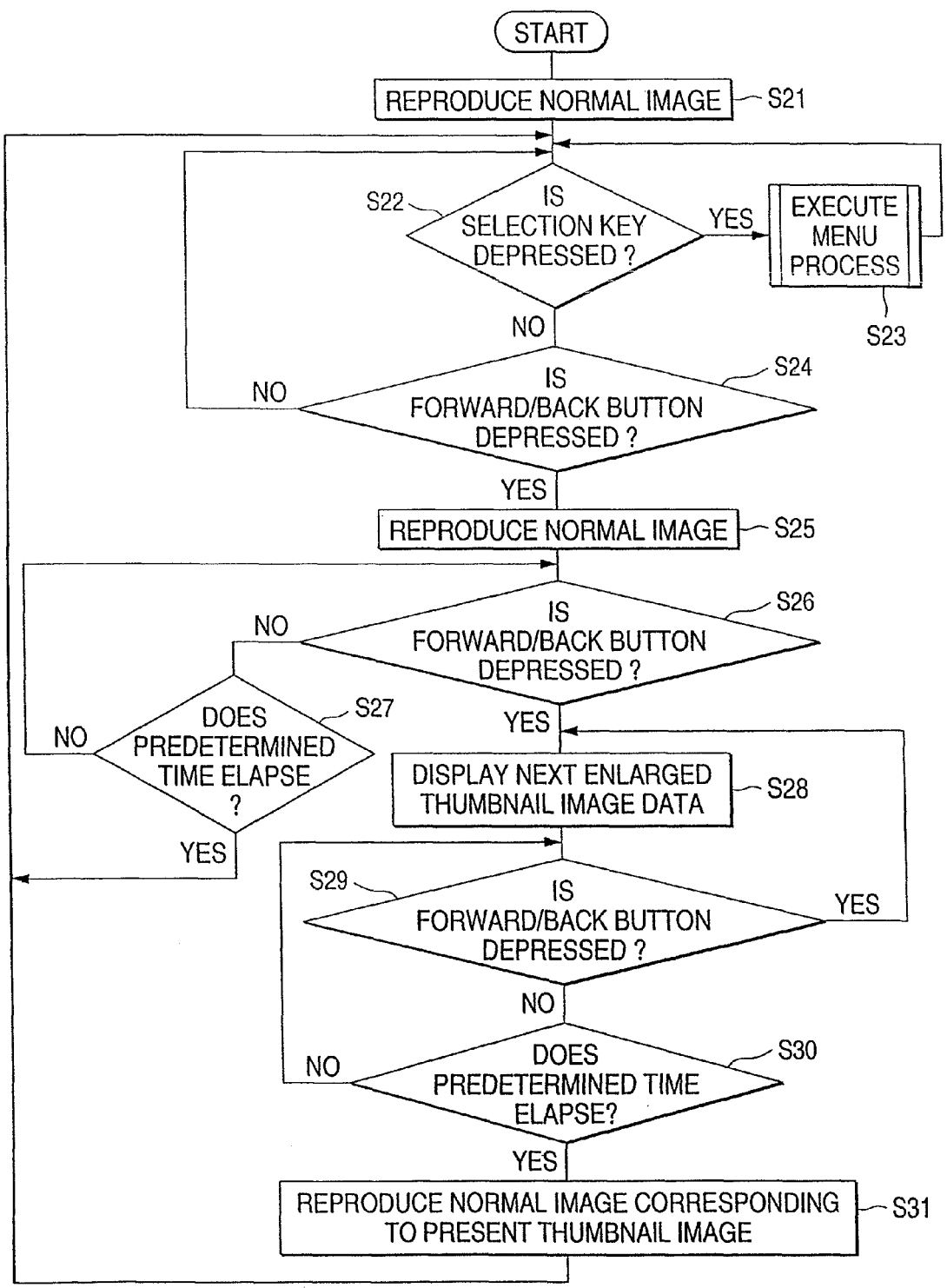
FIG. 7 is a flow chart for describing an example of operation of the high speed image selecting means.

FIG. 7 is a flow chart for indicating an example of operations of the high speed image selecting means. It is assumed that as an initial condition, both the thumbnail image data and the image data have been JPEG-compressed and the JPEG-compressed image data have been recorded on the recording medium 9.

In the example of FIG. 6, when the fast-forward/fast-backward key buttons 19/20 are continuously depressed under a predetermined condition, the process operation is advanced to the high speed selection mode. In this example, when either the button 19, or the button 20 is firstly depressed from the normal reproducing condition, the normal reproducing operation is carried out. The process operation is advanced to the high speed selection mode after the second process operation.

In other words, when the normal reproducing operation is executed (step S21), a check is made as to whether or not a selection key of a menu is depressed (step S22). When the selection key is not depressed (step S22: YES), after a menu process is executed (step S23), the process operation is returned to the step S22. On the other hand, when the button 19, or the button 20 is depressed (step S24: YES) while the selection key is not depressed (step S22: NO), since the first button manipulation is executed, the compressed image data expanding means 64 acquires one preceding image data, or one succeeding image data into the RAM 42, and expands/extends these acquired image data. Subsequently, the image display means 65 transfers the image data extended in the RAM 42 to the frame memory 12A so as to extend this image data as a picture image which is displayed on the liquid crystal display 16 (step S25).

Next, in such a case that either the button 19 or the button 20 is not depressed for a predetermined time period, e.g., 1 second or 2 second (step S26: NO, step S27: YES), the process operation is returned to the step S22. Conversely, when either the button 19 or the button 20 is depressed within a predetermined time period (step S26: YES), since this is the second key manipulation, the process operation is advanced to the high speed image selection mode. The thumbnail compression image data expanding means 61 acquires thumbnail image data corresponding to one preceding image data, or the one succeeding image data into the RAM 42, the thumbnail image data into the RAM 42, and then expands the JPEG-compressed thumbnail image data to extend the expanded thumbnail image data into the RAM 42. Subsequently, the thumbnail image enlarging/displaying means 62 enlarges/interpolates the thumbnail image data (namely, simple interpolation method in this embodiment). Thus, the interpolated thumbnail image data is displayed as an enlarged thumbnail image on the liquid crystal display 16 (step S28).

After the display of this enlarged thumbnail image is accomplished, if the button is not depressed within a predetermined time period, for example, 1 second, or 2 seconds (step S29: YES), then the process operation is returned to the step S28 at which either one preceding thumbnail image or one succeeding thumbnail image is enlarged to be displayed. When the button is continuously depressed within a predetermined time period, this process operation is repeatedly performed, so that the high speed image selection can be realized.

On the other hand, when the button is not depressed for predetermined time period (step S19: NO, step S30: YES), the compression image data expanding means 64 acquires the image data corresponding to this enlarged thumbnail image from the RAM 42 to expand this acquired image data, and then extends the expanded image data into this RAM 42. Subsequently, the image display means 65 transfers the image data extended in the RAM 42 to the frame memory 12A so as to be extended as the picture image. Then, the image display means 65 overwrites this extended image data on the liquid crystal display 16 (step S31). Then, the process operation is returned to the step S22.

In FIG. 7, when the fast-forward/fast-backward keys are depressed after the normal image reproducing operation, the operation mode is advanced to the high speed selection mode after the second key operation. Alternatively, a predetermined flag may be set by executing the first key operation during the first process operation and the second process operation, so that the first and second process operations can be discriminated from the process operations subsequent to the second process operation. Also, the operation mode is forcibly advanced to the high speed selection mode when the second process operation is carried out. Alternatively, after the first key manipulation, when a predetermined time period (for example, 1 to 3 seconds) has passed, it may be judged that the first key manipulation is again carried out.

While the operations of the high speed image selection process have been described, switching of the normal reproduction operation and the high speed selection reproduction operation may be executed by manipulating a predetermined switch, otherwise by any other manners.

Although the various embodiments of the present invention have been described, the present invention is not limited to the above-explained embodiments, but may be modified, substituted, or changed.

As previously described in detail, according to the present invention, the thumbnail images are enlarged to be displayed so as to select a desirable image. While this desirable thumbnail image is displayed in the enlarge form, the image data corresponding to this thumbnail image is expand-processed, and thus the clear image can be displayed. As a consequence, even when a predetermined time duration is required to expand the JPEG-compressed image of 1 frame, the user does not have lengthy time feelings of the image display. Also, since the thumbnail image can be fed in the fast-forward/fast-backward modes, the desirable image which is recorded on the recording medium in the later order can be selected within a short time period.

As described above, the storage of the data captured during the taking of a photographic image may include the storing of the compressed high resolution image, and the storing of a corresponding lower resolution image. Although referred to herein as "thumbnail", the lower resolution image need not be limited to a thumbnail, but can be a so-called screen-nail or other type of lower resolution image. For the sake of generality, any such lower resolution image referred to above using the term "thumbnail" should be understood to mean any image of lower resolution than the corresponding high resolution image that was taken in the photographic operation.

It will also be appreciated that the sequential showing of individual lower resolution images may be thought of as a fast display mode. It will also be understood that the showing of a display image by expanding the compressed high resolution image and displaying it may be thought of as a normal display mode.

What is claimed is:

1. An apparatus comprising:
a user instruction receiver configured to receive a first user instruction, a second user instruction, and a third user instruction;
a memory configured to store captured images as at least one of a low resolution image and a high resolution image; and
a controller configured to display a first screen for displaying the low resolution image without displaying the high resolution image on a display and configured to display a second screen for displaying the high resolution image without displaying the low resolution image on the display, wherein:
the controller, when the user instruction receiver receives the first user instruction, configured to change the low resolution image on the display,
the controller, when the user instruction receiver receives the second user instruction, configured to change the high resolution image on the display,
the controller, when the user instruction receiver receives the third user instruction, configured to change from the first screen to the second screen on the display,
the memory is further configured to store a first image and a second image of the captured images, and
the controller configured to change, by scrolling, from the first stored image to the second stored image, which is different from the first stored image, on the display, the first stored image displayed on the display without displaying the second stored image on the display, the second stored image displayed on the display without displaying the first stored image on the display.

2. The apparatus according to claim 1, wherein a pixel number of the low resolution image is smaller than a pixel number of the high resolution image.

3. The apparatus according to claim 1, further comprising:
an imaging element configured to produce image data based on imaging light, wherein
the low resolution image and the high resolution image are produced based on the image data.

4. An apparatus including a face formed with a display, the apparatus comprising:
- a user instruction receiver provided on the face and configured to receive a first user instruction, a second user instruction and a third user instruction;
- a memory configured to store captured images as at least one of the low resolution image and the high resolution image; and
- a controller configured to display a first screen for displaying a low resolution image without displaying a high resolution image on the display and configured to display a second screen for displaying the high resolution image without displaying the low resolution image on the display, wherein
- the controller, when the user instruction receiver receives the first user instruction, configured to change the low resolution image on the display,
- the controller, when the user instruction receiver receives the second user instruction, configured to change the high resolution image on the display,
- the controller, when the user instruction receiver receives the third user instruction, configured to change from the first screen to the second screen on the display,
- the memory is further configured to store a first image and a second image of the captured images, and
- the controller configured to change, by scrolling, from the first stored image to the second stored image, which is different from the first stored image, on the display, the first stored image displayed on the display without displaying the second stored image on the display, the second stored image displayed on the display without displaying the first stored image on the display.

5. The apparatus according to claim 1, further comprising an image capturer configured to capture images and store the captured images in a frame memory.

6. The apparatus according to claim 5, wherein the controller is further configured to image process the captured images that are stored in the frame memory and wherein the processed images including the first and second images that are stored in the memory for said scrolling.

7. The apparatus of claim 6, wherein the memory is a main memory of the apparatus.

8. The apparatus of claim 6, wherein the memory comprises a built-in recording memory configured to store the captured first image and an enlarged recording memory configured to store the captured second image.

* * * * *